United States Patent
Ariga et al.

(10) Patent No.: US 11,367,575 B2
(45) Date of Patent: *Jun. 21, 2022

(54) MULTI-LAYER CERAMIC CAPACITOR

(71) Applicant: Taiyo Yuden Co., Ltd., Tokyo (JP)

(72) Inventors: Jyouji Ariga, Tokyo (JP); Katsuo Sakatsume, Tokyo (JP); Masumi Ishii, Tokyo (JP); Takeshi Nosaki, Tokyo (JP); Norihiro Arai, Tokyo (JP); Yasushi Inoue, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/116,602

(22) Filed: Dec. 9, 2020

(65) Prior Publication Data

US 2021/0090813 A1 Mar. 25, 2021

Related U.S. Application Data

(63) Continuation of application No. 16/206,326, filed on Nov. 30, 2018, now Pat. No. 10,892,102.

(30) Foreign Application Priority Data

Dec. 7, 2017 (JP) .............................. JP2017-235341

(51) Int. Cl.
  *H01G 4/30* (2006.01)
  *H01G 4/008* (2006.01)
  *H01G 4/12* (2006.01)

(52) U.S. Cl.
  CPC .............. *H01G 4/30* (2013.01); *H01G 4/008* (2013.01); *H01G 4/1236* (2013.01)

(58) Field of Classification Search
  None
  See application file for complete search history.

(56) References Cited

U.S. PATENT DOCUMENTS 6,045,893 A * 4/2000 Fukushima ......... H01F 17/0013
                                                    174/255
7,342,767 B2   3/2008 Naito et al.
(Continued)

FOREIGN PATENT DOCUMENTS

JP          2000-306762 A      11/2000

OTHER PUBLICATIONS

Office Action dated Jan. 29, 2020 in U.S. Appl. No. 16/206,326.
(Continued)

*Primary Examiner* — Dion R. Ferguson
(74) *Attorney, Agent, or Firm* — Saliwanchik, Lloyd & Eisenschenk (57) ABSTRACT

A multi-layer ceramic capacitor includes: a ceramic body including ceramic layers laminated along one axial direction, first and second internal electrodes alternately disposed between the ceramic layers, first and second end surfaces to which the first and second internal electrodes are respectively drawn, a first end margin that forms an interval between the first end surface and the second internal electrodes, and a second end margin that forms an interval between the second end surface and the first internal electrodes; and first and second external electrodes that respectively cover the first and second end surfaces and are respectively connected to the first and second internal electrodes, the multi-layer ceramic capacitor satisfying the following relationship: $S_E \geq S/400+300$, where S (μm) represents an area of the ceramic body and $S_E$ (μm) represents a total area of the first and second internal electrodes in cross sections of the first and second end margins.

20 Claims, 6 Drawing Sheets

(56) References Cited

U.S. PATENT DOCUMENTS

| | | | |
|---|---|---|---|
| 8,995,110 B2 | 3/2015 | Takeoka | |
| 9,177,725 B2* | 11/2015 | Kim | H01G 4/012 |
| 9,633,788 B2* | 4/2017 | Fukunaga | H01G 4/1218 |
| 10,892,102 B2* | 1/2021 | Ariga | H01G 4/1236 |
| 2011/0038097 A1 | 2/2011 | Matsuda et al. | |
| 2013/0049532 A1 | 2/2013 | Kim et al. | |
| 2013/0222972 A1 | 8/2013 | Saito et al. | |
| 2013/0286539 A1 | 10/2013 | Kim et al. | |
| 2014/0240898 A1 | 8/2014 | Kim et al. | |
| 2015/0022941 A1 | 1/2015 | Cho et al. | |
| 2015/0340155 A1 | 11/2015 | Fukunaga et al. | |
| 2016/0284471 A1 | 9/2016 | Mizuno et al. | |
| 2016/0284473 A1* | 9/2016 | Murosawa | H01G 4/012 |
| 2017/0278635 A1 | 9/2017 | Mizuno et al. | |
| 2018/0012702 A1 | 1/2018 | Azuma et al. | |
| 2018/0190435 A1* | 7/2018 | Kishi | H01G 4/248 |
| 2019/0057813 A1* | 2/2019 | Okamoto | H01G 4/248 |
| 2019/0096578 A1* | 3/2019 | Arai | C04B 35/465 |
| 2019/0180940 A1* | 6/2019 | Ariga | H01G 4/008 |

OTHER PUBLICATIONS

Office Action dated Jul. 15, 2020 in U.S. Appl. No. 16/206,326.
Notice of Allowance dated Oct. 19, 2020 in U.S. Appl. No. 16/206,326.

\* cited by examiner

MULTI-LAYER CERAMIC CAPACITOR

CROSS-REFERENCE TO RELATED APPLICATION

This application is a continuation of U.S. application Ser. No. 16/206,326, filed Nov. 30, 2018; which claims the benefit under 35 U.S.C. § 119 of Japanese Application No. 2017-235341 filed Dec. 7, 2017, which is hereby incorporated in its entirety.

BACKGROUND

The present disclosure relates to a multi-layer ceramic capacitor that is usable in a high frequency range.

As electronic devices become adaptable to a higher frequency, multi-layer ceramic capacitors used in the electronic devices are expected to have a higher quality factor (Q factor) in a high frequency range. For example, Japanese Patent Application Laid-open No. 2000-306762 discloses a multi-layer ceramic capacitor including internal electrodes whose thicknesses are made larger to achieve improvement in Q factor in a high frequency range.

SUMMARY

In the multi-layer ceramic capacitor, however, when the thickness of each internal electrode is made larger, the number of laminated layers is inevitably reduced, which reduces the capacitance. Further, in a high frequency range, electrical conduction in the vicinity of the surfaces of the internal electrodes becomes dominant due to the skin effect. For that reason, there is a limitation on the improvement in Q factor by increase in thickness of the internal electrodes.

In view of the circumstances as described above, it is desirable to provide a multi-layer ceramic capacitor capable of obtaining a high Q factor.

According to an embodiment of the present disclosure, there is provided a multi-layer ceramic capacitor including a ceramic body, a first external electrode, and a second external electrode.

The ceramic body includes ceramic layers laminated along one axial direction, first internal electrodes and second internal electrodes that are alternately disposed between the ceramic layers, a first end surface to which the first internal electrodes are drawn, a second end surface to which the second internal electrodes are drawn, a first end margin that forms an interval between the first end surface and the second internal electrodes, and a second end margin that forms an interval between the second end surface and the first internal electrodes.

The first external electrode covers the first end surface and is connected to the first internal electrodes.

The second external electrode covers the second end surface and is connected to the second internal electrodes.

The multi-layer ceramic capacitor satisfies the following relationship:

$$S_E \geq S/400 + 300,$$

where S (μm) represents an area of the ceramic body and $S_E$ (μm) represents a total area of the first internal electrodes and the second internal electrodes in cross sections of the first end margin and the second end margin that are respectively parallel to the first end surface and the second end surface.

In this configuration, the total area of the cross sections of the first and second internal electrodes is large, and thus the electrical conductivity of the first and second internal electrodes is high. This reduces equivalent series resistance (ESR) in this multi-layer ceramic capacitor, and a high Q factor is thus obtained.

The first internal electrodes and the second internal electrodes may each contain copper as a main component.

The first internal electrodes and the second internal electrodes may each have a thickness of 6 μm or smaller.

The ceramic layers may each have a Perovskite structure as a main phase, the Perovskite structure containing calcium and zirconium and being expressed by a general expression of $ABO_3$.

It is possible to provide a multi-layer ceramic capacitor capable of obtaining a high Q factor.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. Basic Configuration of Multi-layer Ceramic Capacitor 10

Figure 1:
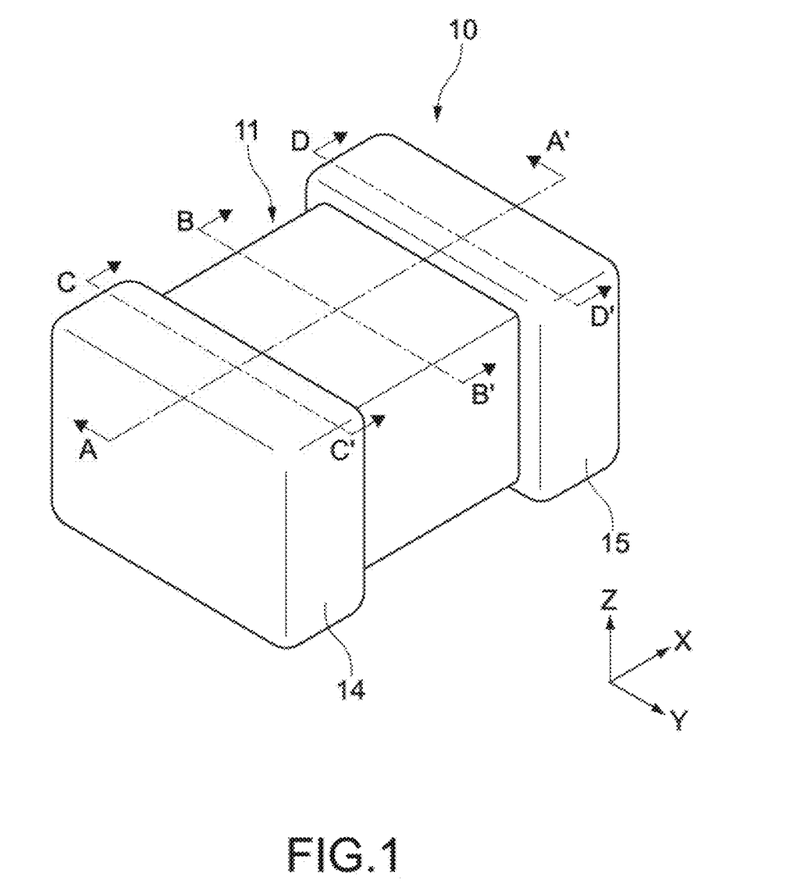
FIG. 1 is a perspective view of a multi-layer ceramic capacitor according to an embodiment of the present disclosure.
Figure 2:
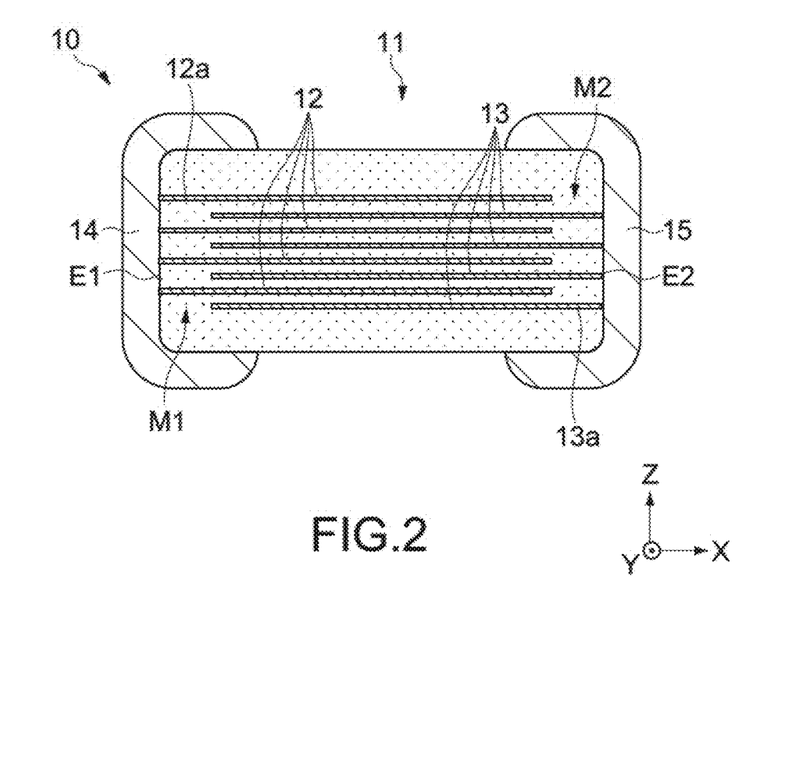
FIG. 2 is a cross-sectional view of the multi-layer ceramic capacitor taken along the A-A' line in FIG. 1.
Figure 3:
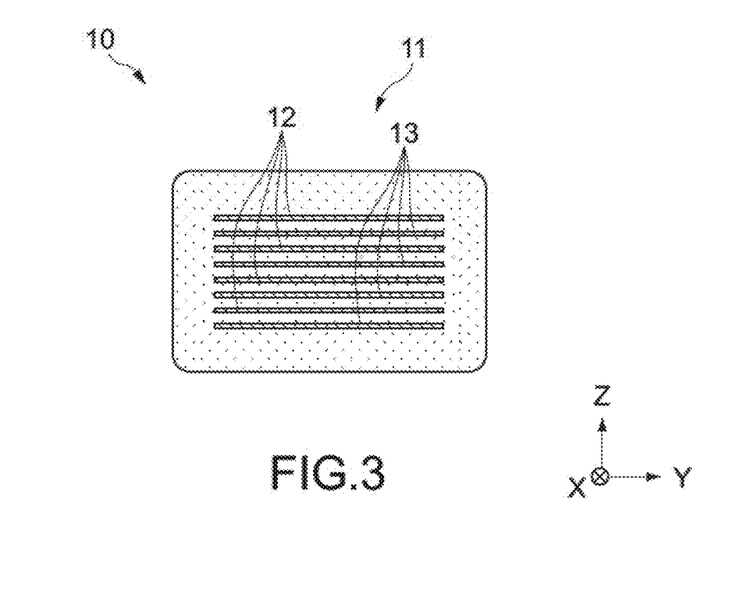
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 is configured to be suitably usable in a high frequency range of approximately 100 MHz to 2 GHz, and can be used as, for example, a high-frequency dielectric resonator or filter. The multi-layer ceramic capacitor 10 is configured to have a high quality factor (Q factor) in a high frequency range.

The multi-layer ceramic capacitor 10 includes a ceramic body 11, a first external electrode 14, and a second external electrode 15. The outer surface of the ceramic body 11 includes a first end surface E1 and a second end surface E2 facing in an X-axis direction, a first side surface and a second side surface facing in a Y-axis direction, and a first main surface and a second main surface facing in a Z-axis direction.

It should be noted that the shape of the ceramic body 11 is not limited to the above. In other words, the ceramic body 11 does not need to have the rectangular shape as shown in FIGS. 1 to 3. For example, the surfaces of the ceramic body 11 may be curved surfaces, and the ceramic body 11 may be rounded as a whole.

The first external electrode 14 covers the first end surface E1 of the ceramic body 11. The second external electrode 15 covers the second end surface E2 of the ceramic body 11. The first and second external electrodes 14 and 15 face each other in the X-axis direction while sandwiching the ceramic body 11 therebetween and function as terminals of the multi-layer ceramic capacitor 10.

The first and second external electrodes 14 and 15 respectively extend from the first and second end surfaces E1 and E2 of the ceramic body 11 to the first and second main surfaces and to the first and second side surfaces. With this configuration, both of the first and second external electrodes 14 and 15 have U-shaped cross sections parallel to the X-Z plane shown in FIG. 2 and to the X-Y plane.

It should be noted that the shape of each of the first and second external electrodes 14 and 15 is not limited to the shape shown in FIG. 1. For example, the first and second external electrodes 14 and 15 may respectively extend from the first and second end surfaces E1 and E2 of the ceramic body 11 to one of the main surfaces thereof and may have L-shaped cross sections parallel to the X-Z plane. Alternatively, the first and second external electrodes 14 and 15 may not extend to any of the main surfaces and side surfaces.

The first and second external electrodes 14 and 15 are each formed of a good conductor of electricity. Examples of the good conductor of electricity forming the first and second external electrodes 14 and 15 include a metal or alloy mainly containing copper (Cu), nickel (Ni), tin (Sn), palladium (Pd), platinum (Pt), silver (Ag), gold (Au), or the like.

The ceramic body 11 is formed of dielectric ceramics. The ceramic body 11 includes first internal electrodes 12 and second internal electrodes 13 that are covered with dielectric ceramics. The first and second internal electrodes 12 and 13 each have a sheet-like shape extending along the X-Y plane and are alternately disposed along the Z-axis direction.

The ceramic body 11 includes a first end margin M1 and a second end margin M2. The first end margin M1 forms an interval between the first end surface E1 and the second internal electrodes 13. The second end margin M2 forms an interval between the second end surface E2 and the first internal electrodes 12. In other words, the first end margin M1 includes only the first internal electrodes 12, and the second end margin M2 includes only the second internal electrodes 13.

Each first internal electrode 12 includes a first drawn portion 12a that is drawn to the first end surface E1. In other words, the first drawn portion 12a penetrates the first end margin M1 outwardly in the X-axis direction and is connected to the first external electrode 14 in the first end surface E1. In such a manner, only the first internal electrodes 12 are connected to the first external electrode 14.

Each second internal electrode 13 includes a second drawn portion 13a that is drawn to the second end surface E2. In other words, the second drawn portion 13a penetrates the second end margin M2 outwardly in the X-axis direction and is connected to the second external electrode 15 in the second end surface E2. In such a manner, only the second internal electrodes 13 are connected to the second external electrode 15.

With this configuration as described above, when a voltage is applied between the first external electrode 14 and the second external electrode 15 in the multi-layer ceramic capacitor 10, the voltage is applied to the plurality of ceramic layers between the first internal electrodes 12 and the second internal electrodes 13. Thus, the multi-layer ceramic capacitor 10 stores charge corresponding to the voltage applied between the first external electrode 14 and the second external electrode 15.

In order to exert stable performance in a high frequency range, the multi-layer ceramic capacitor 10 is expected to have a small temperature dependence of a capacitance. For that reason, the ceramic body 11 needs to use dielectric ceramics having a small temperature dependence of a dielectric constant so as to reduce the temperature dependence of the capacitance of each ceramic layer.

Accordingly, it is favorable that the ceramic body 11 is formed of polycrystal having a Perovskite structure as a main phase. The Perovskite structure contains calcium (Ca) and zirconium (Zr) having a small temperature dependence of a dielectric constant and is expressed by a general expression of $ABO_3$ ("A" represents an A-site element and "B" represents a B-site element).

In the Perovskite structure as the main phase of the polycrystal, calcium (Ca) is an A-site element, and zirconium (Zr) is a B-site element. Specifically, the main phase of the polycrystal constituting the ceramic body 11 can have a composition expressed by $Ca_xZrO_3$ ($0.90 \leq x \leq 1.15$).

The first and second internal electrodes 12 and 13 are each formed of a good conductor of electricity and function as internal electrodes of the multi-layer ceramic capacitor 10. It is favorable that the first and second internal electrodes 12 and 13 contain copper (Cu) as a main component. With this configuration, the electrical conductivity of the first and second internal electrodes 12 and 13 increases in the multi-layer ceramic capacitor 10, so that equivalent series resistance (ESR) is reduced, and a high Q factor is obtained.

It should be noted that the first and second internal electrodes 12 and 13 may not contain copper (Cu) as a main component. In this case, the first and second internal electrodes 12 and 13 can be formed of, for example, a metal or alloy mainly containing one type or two or more types selected from the group consisting of nickel (Ni), palladium (Pd), platinum (Pt), silver (Ag), and gold (Au).

It should be noted that the basic configuration of the multi-layer ceramic capacitor 10 according to this embodiment is not limited to the configuration shown in FIGS. 1 to 3 and can be changed as appropriate. For example, the shapes of the ceramic body 11 and the first and second external electrodes 14 and 15 can be determined as appropriate according to the size and performance expected for the multi-layer ceramic capacitor 10.

2. Detailed Configurations of First and Second End Margins M1 and M2

Figure 4A:
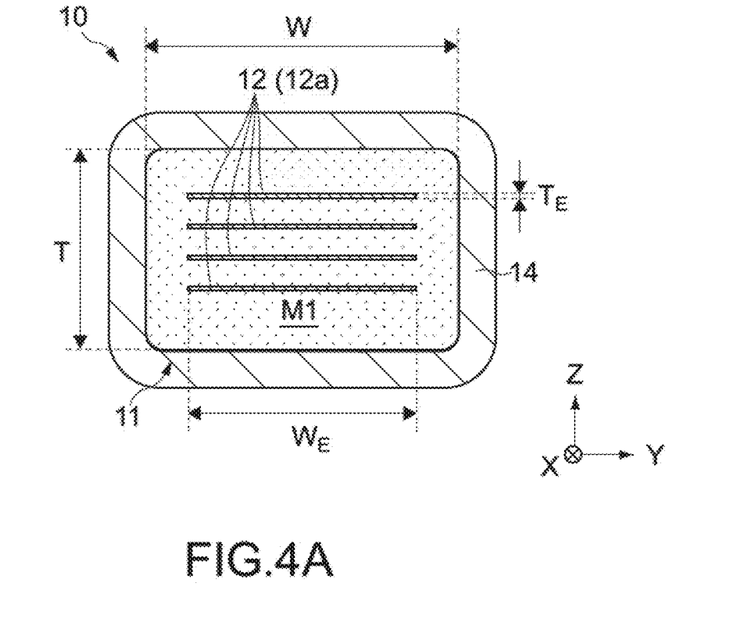
FIG. 4A is a cross-sectional view of the multi-layer ceramic capacitor taken along the C-C' line in FIG. 1.
Figure 4B:
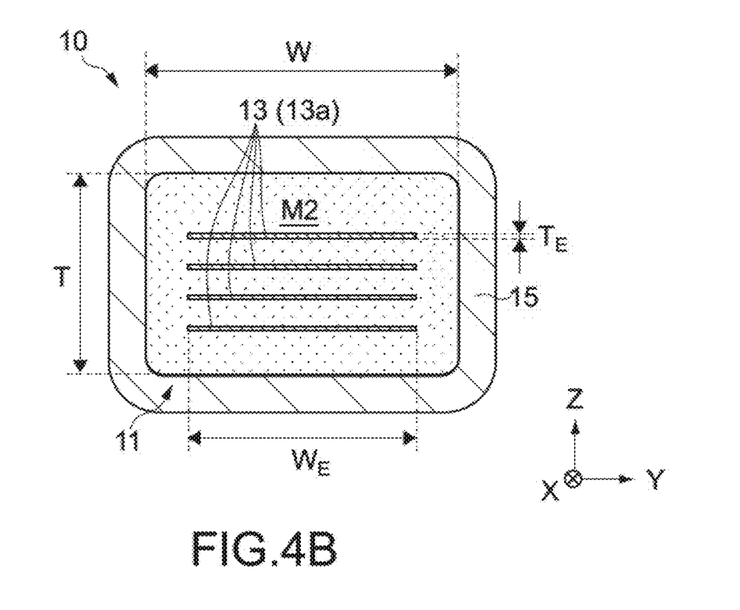
FIG. 4B is a cross-sectional view of the multi-layer ceramic capacitor taken along the D-D' line in FIG. 1.

FIG. 4A is a cross-sectional view of the multi-layer ceramic capacitor 10 taken along the C-C' line in FIG. 1. FIG. 4B is a cross-sectional view of the multi-layer ceramic capacitor 10 taken along the D-D' line in FIG. 1. In other words, FIG. 4A shows a cross section of the first end margin M1 that is parallel to the first end surface E1, and FIG. 4B shows a cross section of the second end margin M2 that is parallel to the second end surface E2.

FIGS. 4A and 4B show a dimension W of the ceramic body 11 in the Y-axis direction and a dimension T of the ceramic body 11 in the Z-axis direction. Further, FIGS. 4A and 4B show a dimension $W_E$ of each of the first and second internal electrodes 12 and 13 in the Y-axis direction and a thickness $T_E$ of each of the first and second internal electrodes 12 and 13 in the Z-axis direction.

It is favorable that the cross sections shown in FIGS. 4A and 4B are cross sections of the first and second end margins M1 and M2 at the center portions thereof in the X-axis direction. In other words, it is favorable that the dimensions W and T of the ceramic body 11 and the dimensions $W_E$ and the thickness $T_E$ of each of the first and second internal electrodes 12 and 13 are measured at the center portions of the first and second end margins M1 and M2 in the X-axis direction.

In the cross sections shown in FIGS. 4A and 4B, an area S of the ceramic body 11 can be expressed as "S=W*T" by using the dimensions W and T. Further, in the cross sections shown in FIGS. 4A and 4B, a total area $S_E$ of the first and second internal electrodes 12 and 13 can be expressed as "$S_E=W_E*T_E*n$" by using the dimension $W_E$, the thickness $T_E$, and the number n of first and second internal electrodes 12 and 13.

In this embodiment, the ratio of the total area $S_E$ of the first and second internal electrodes 12 and 13 to the area S of the ceramic body 11 in the cross sections of the first and second end margins M1 and M2 is increased, and thus high electrical conductivity is ensured in the first and second internal electrodes 12 and 13. With this configuration, in the multi-layer ceramic capacitor 10, the ESR is reduced, and a high Q factor is thus obtained.

Specifically, in the multi-layer ceramic capacitor 10 according to this embodiment, the area S of the ceramic body 11 and the total area $S_E$ of the first and second internal electrodes 12 and 13 in the cross sections shown in FIGS. 4A and 4B are configured so as to satisfy a relationship of the following expression (1), and a high Q factor is thus obtained.

$$S_E \geq S/400+300 \tag{1}$$

Further, the ratio of the total area $S_E$ of the first and second internal electrodes 12 and 13 to the area S of the ceramic body 11 in the cross sections shown in FIGS. 4A and 4B is increased, and thus a proportion of the first and second internal electrodes 12 and 13 in the first and second end surfaces E1 and E2 of the ceramic body 11 increases. This increases the bonding strength between the first external electrode 14 and the first internal electrodes 12 and between the second external electrode 15 and the second internal electrodes 13.

Meanwhile, in the high frequency range, even if the thickness $T_E$ of each of the first and second internal electrodes 12 and 13 is increased, the skin effect causes a current to flow only in the skin extending from the surface to a predetermined depth. Accordingly, an effect of increasing the thickness $T_E$ of each of the first and second internal electrodes 12 and 13 and thus reducing an electrical resistance is saturated depending on the skin depth of each of the first and second internal electrodes 12 and 13.

For example, the skin depth of the copper (Cu) is approximately 6.6 μm in 100 MHz, approximately 2.1 μm in 1 GHz, and approximately 1.5 μm in 2 GHz. Accordingly, when the copper (Cu) is a main component, the thickness $T_E$ of each of the first and second internal electrodes 12 and 13 is favorably kept to 6 μm or smaller, more favorably 2 μm or smaller, and still more favorably 1.5 μm or smaller. In such a manner, when the thickness $T_E$ of each of the first and second internal electrodes 12 and 13 is kept to be small, the number of laminated ceramic layers in the ceramic body 11 can be increased. This increases the capacitance of the multi-layer ceramic capacitor 10.

3. Method of Producing Multi-Layer Ceramic Capacitor 10

Figure 5:
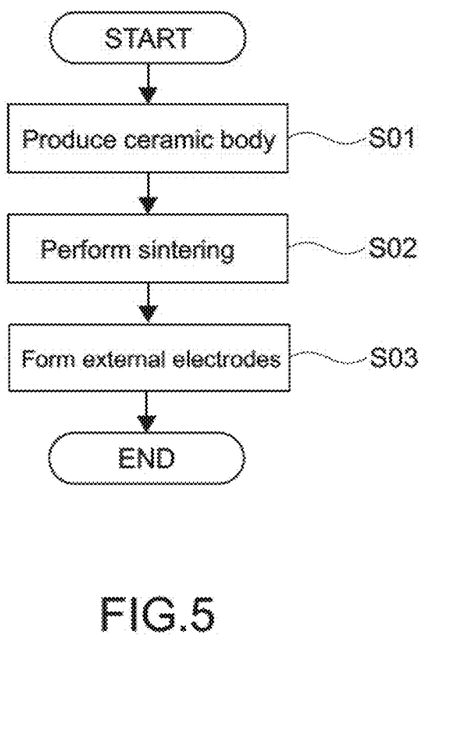
FIG. 5 is a flowchart showing a method of producing the multi-layer ceramic capacitor.

FIG. 5 is a flowchart showing a method of producing the multi-layer ceramic capacitor 10. Hereinafter, the method of producing the multi-layer ceramic capacitor 10 will be described according to FIG. 5.

3.1 Step S01: Production of Ceramic Body

Figure 6:
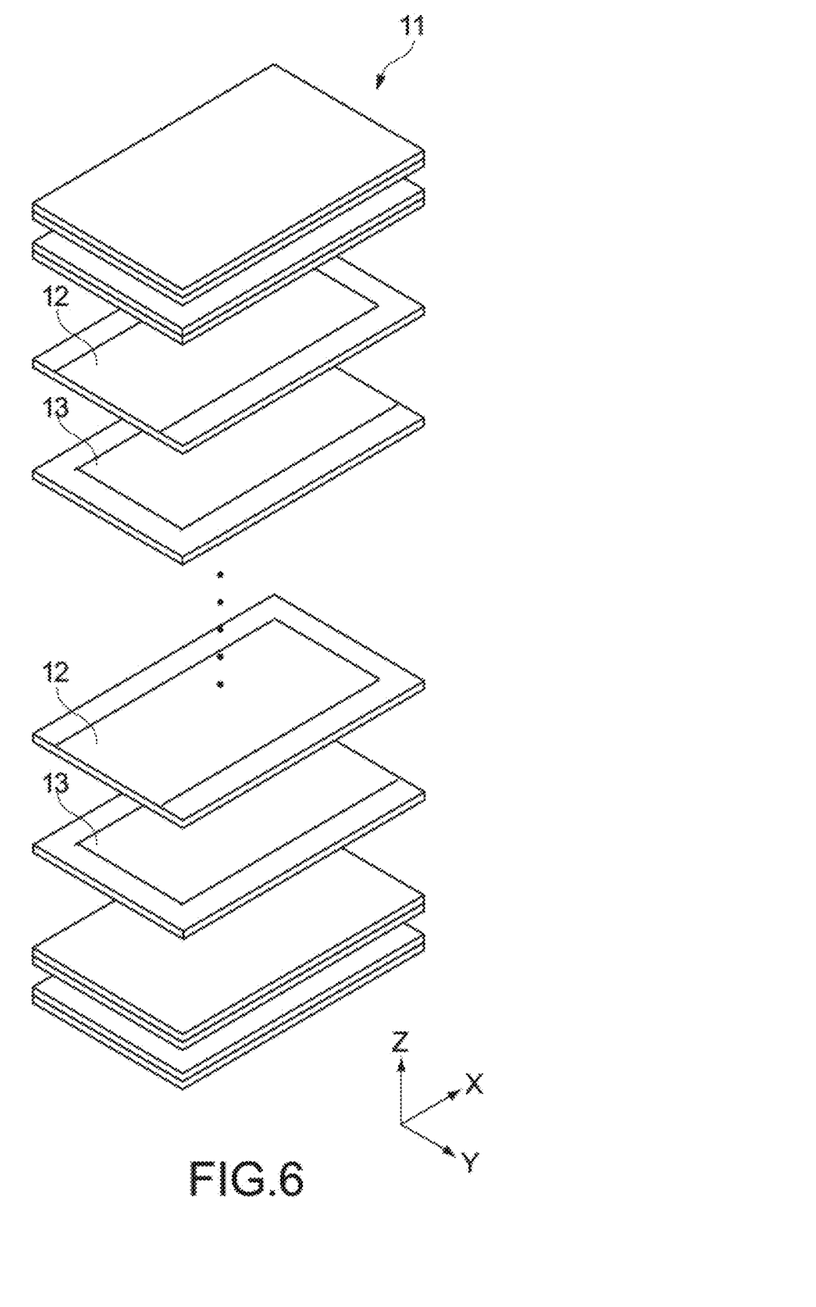
FIG. 6 is a perspective view of a multi-layer structure of a ceramic body.

In Step S01, an unsintered ceramic body 11 is produced. The unsintered ceramic body 11 is obtained by laminating a plurality of ceramic sheets in the Z-axis direction as shown in FIG. 6 and performing thermocompression bonding on the ceramic sheets. Electrically conductive paste is printed on the ceramic sheets in predetermined patterns in advance, and thus the first and second internal electrodes 12 and 13 can be provided.

The ceramic sheets are unsintered dielectric green sheets obtained by forming ceramic slurry into a sheet shape. The ceramic sheets are each formed into a sheet shape by using a roll coater or a doctor blade, for example. Components of the ceramic slurry are adjusted such that the ceramic body 11 having a predetermined composition is obtained.

The thickness $T_E$ of each of the first and second internal electrodes 12 and 13 in the cross sections shown in FIGS. 4A and 4B can be controlled by the thickness of the electrically conductive paste to be printed onto the ceramic sheets. Accordingly, the total area $S_E$ of the first and second internal electrodes 12 and 13 in the cross sections shown in FIGS. 4A and 4B are capable of being controlled by the thickness of the electrically conductive paste, the number of laminated ceramic sheets, and the like.

3.2 Step S02: Sintering

In Step S02, the unsintered ceramic body 11 obtained in Step S01 is sintered. Thus, the sintered ceramic body 11 is obtained. Sintering of the ceramic body 11 can be performed in a reduction atmosphere or a low-oxygen partial pressure atmosphere, for example. Sintering conditions for the ceramic body 11 can be determined as appropriate.

3.3 Step S03: Formation of External Electrodes

In Step S03, the first external electrode 14 and the second external electrode 15 are formed on the ceramic body 11 obtained in Step S02, to thus produce the multi-layer ceramic capacitor 10 shown in FIGS. 1 to 3. In Step S03, for example, base films, intermediate films, and surface films that constitute the first and second external electrodes 14 and 15 are formed on the first and second end surfaces E1 and E2 of the ceramic body 11.

More specifically, in Step S03, an unsintered electrode material is first applied so as to cover both the first and second end surfaces E1 and E2 of the ceramic body 11. The applied unsintered electrode materials are subjected to baking in a reduction atmosphere or a low-oxygen partial pressure atmosphere, for example, to thus form base films of the first and second external electrodes 14 and 15 on the ceramic body 11.

On the base films of the first and second external electrodes 14 and 15, which are baked onto the ceramic body 11, intermediate films of the first and second external electrodes 14 and 15 are then formed, and surface films of the first and second external electrodes 14 and 15 are further formed. For the formation of the intermediate films and the surface films of the first and second external electrodes 14 and 15, for example, wet plating such as electrolytic plating can be used.

It should be noted that part of the processing in Step S03 described above may be performed before Step S02. For example, before Step S02, the unsintered electrode material may be applied to the first and second end surfaces E1 and E2 of the unsintered ceramic body 11. Accordingly, sintering of the ceramic body 11 and baking of the electrode material can be simultaneously performed in Step S02.

4. EXAMPLES AND COMPARATIVE EXAMPLES

Examples and Comparative examples of the embodiment will be described. Examples and Comparative examples to be described below are merely examples for confirming the effects of the embodiment described above. Accordingly, the configuration of the embodiment described above is not limited to the configurations of Examples. Specifically, in Examples 1 to 5 and Comparative examples 1 to 5, samples of the multi-layer ceramic capacitors 10 were produced by the production method described above.

In any of Examples 1 to 5 and Comparative examples 1 to 5, the capacitance of the sample was set to 1.0 pF. The samples according to Examples 1 to 5 and Comparative examples 1 to 5 are different between those examples in the configurations of the ceramic body 11 and the first and second internal electrodes 12 and 13. Table 1 shows the configurations of the ceramic body 11 and the first and second internal electrodes 12 and 13 of the samples according to Examples 1 to 5 and Comparative examples 1 to 5.

TABLE 1

| | W [μm] | T [μm] | S [μm²] | $W_E$ [μm] | $T_E$ [μm] | n [Number] | $S_E$ [μm²] |
|---|---|---|---|---|---|---|---|
| Example 1 | 180 | 180 | 32400 | 80 | 2.0 | 3 | 480 |
| Example 2 | 270 | 270 | 72900 | 100 | 2.0 | 3 | 600 |
| Example 3 | 495 | 495 | 245025 | 180 | 2.5 | 3 | 1350 |
| Example 4 | 695 | 695 | 483025 | 250 | 4.0 | 3 | 3000 |
| Example 5 | 1260 | 815 | 1026900 | 250 | 4.0 | 3 | 3000 |
| Comparative Example 1 | 180 | 180 | 32400 | 80 | 2.2 | 2 | 352 |
| Comparative Example 2 | 270 | 270 | 72900 | 100 | 2.2 | 2 | 440 |
| Comparative Example 3 | 495 | 495 | 245025 | 180 | 1.5 | 3 | 810 |
| Comparative Example 4 | 695 | 695 | 483025 | 250 | 2.0 | 3 | 1500 |
| Comparative Example 5 | 1260 | 815 | 1026900 | 250 | 3.0 | 3 | 2250 |

Table 1 shows the dimensions W and T and the area S, which is calculated on the basis of the dimensions W and T, of the ceramic body 11 in the samples according to Examples 1 to 5 and Comparative examples 1 to 5. Further, Table 1 shows the dimension $W_E$, the thickness $T_E$, the number of layers n, and the total area $S_E$, which is calculated on the basis of the dimension $W_E$, the thickness $T_E$, and the number of layers n, of each of the first and second internal electrodes 12 and 13 in the samples according to Examples 1 to 5 and Comparative examples 1 to 5.

Examples 1 to 5 and Comparative examples 1 to 5 are different between those examples in the configurations of the ceramic body 11 and the first and second internal electrodes 12 and 13. The area S of the ceramic body 11 is common and the total area $S_E$ of the first and second internal electrodes 12 and 13 is different between Example 1 and Comparative example 1, between Example 2 and Comparative example 2, between Example 3 and Comparative example 3, between Example 4 and Comparative example 4, and between Example 5 and Comparative example 5.

Figure 7:
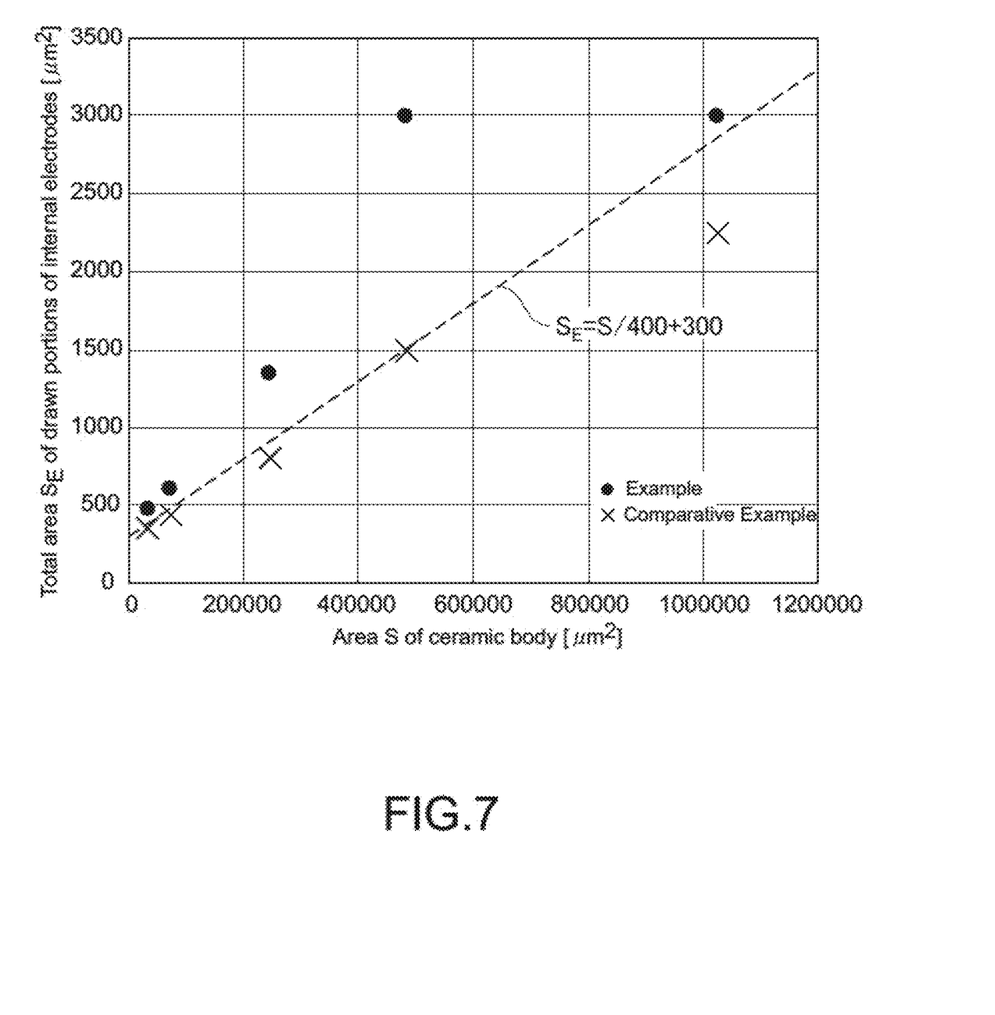
FIG. 7 is a graph showing evaluation results in Examples and Comparative examples.

FIG. 7 is a graph showing the area S of the ceramic body 11 and the total area $S_E$ of the first and second internal electrodes 12 and 13 that are plotted for the samples of Examples 1 to 5 and Comparative examples 1 to 5. In FIG. 7, the horizontal axis represents the area S of the ceramic body 11, and the vertical axis represents the total area $S_E$ of the first and second internal electrodes 12 and 13.

Further, FIG. 7 shows a straight line expressed by the following expression: $S_E = S/400 + 300$. The plots of Examples 1 to 5 are positioned on the upper side of the straight line, that is, satisfy the relationship of the above expression (1). On the other hand, the plots of Comparative examples 1 to 5 are positioned on the lower side of the straight line, that is, do not satisfy the relationship of the above expression (1).

The Q factor in the high frequency range was measured for the samples according to Examples 1 to 5 and Comparative examples 1 to 5. In the measurement of the Q factor for the samples according to Examples 1 to 5 and Comparative examples 1 to 5, the frequency was set to 1 GHz, 2 GHz, and 3 GHz. Table 2 shows measurement results of the Q factor in the samples according to Examples 1 to 5 and Comparative examples 1 to 5.

TABLE 2

| | Q factor | | |
|---|---|---|---|
| | 1 GHz | 2 GHz | 3 GHz |
| Example 1 | 460 | 220 | 120 |
| Example 2 | 485 | 230 | 140 |
| Example 3 | 520 | 240 | 150 |
| Example 4 | 580 | 270 | 165 |
| Example 5 | 770 | 365 | 220 |
| Comparative Example 1 | 370 | 180 | 90 |
| Comparative Example 2 | 390 | 190 | 110 |
| Comparative Example 3 | 410 | 200 | 115 |
| Comparative Example 4 | 440 | 225 | 130 |
| Comparative Example 5 | 530 | 290 | 160 |

Compared between Example 1 and Comparative example 1, between Example 2 and Comparative example 2, between Example 3 and Comparative example 3, between Example 4 and Comparative example 4, and between Example 5 and Comparative example 5, in which the area S of the ceramic body 11 is in common, it is found that Examples 1 to 5 obtain the Q factor higher than that of Comparative examples 1 to 5 by approximately 20% to 50% at any of the frequencies.

What is claimed is:
1. A multi-layer ceramic capacitor, comprising:
a ceramic body that includes
ceramic layers laminated along a first axial direction, first internal electrodes and second internal electrodes that are alternately disposed between the ceramic layers, a first end surface to which the first internal electrodes are drawn, a second end surface to which the second internal electrodes are drawn, a first end margin that forms an interval between the first end surface and the second internal electrodes, and a second end margin that forms an interval between the second end surface and the first internal electrodes;

a first external electrode that covers the first end surface and is connected to the first internal electrodes; and a second external electrode that covers the second end surface and is connected to the second internal electrodes, the multi-layer ceramic capacitor satisfying the following relationship:

$$S_E \geq S/400+300,$$

where S ($\mu m^2$) represents an area of the ceramic body and $S_E$ ($\mu m^2$) represents a total area of the first internal electrodes and the second internal electrodes in cross sections of the first end margin and the second end margin that are respectively parallel to the first end surface and the second end surface, and wherein the multi-layer ceramic capacitor satisfies the following relationship:

$$S_E \leq 3000.$$

2. The multi-layer ceramic capacitor according to claim 1, wherein
the first internal electrodes and the second internal electrodes each contain copper as a main component.

3. The multi-layer ceramic capacitor according to claim 2, wherein
the first internal electrodes and the second internal electrodes each have a thickness of 6 $\mu m$ or smaller.

4. The multi-layer ceramic capacitor according to claim 1, wherein
the multi-layer ceramic capacitor satisfies the following relationship:

$$S_E \leq (S/400+300)*2.$$

5. The multi-layer ceramic capacitor according to claim 1, wherein
a cross-sectional area of each of the first internal electrode and the second internal electrode is 160 $\mu m^2$ or more.

6. The multi-layer ceramic capacitor according to claim 1, wherein
the first end surface and the second end surface face in a second axial direction orthogonal to the first axial direction, and
the multi-layer ceramic capacitor satisfies the following relationship:

$$T_E/W_E \geq 0.01,$$

where $T_E$ represents a dimension in cross sections of each of the first internal electrode and the second internal electrode in the first axial direction, and $W_E$ represents a dimension in the cross sections of each of the first internal electrodes and the second internal electrodes in a third axial direction orthogonal to the first axial direction and the second axial direction.

7. The multi-layer ceramic capacitor according to claim 1, wherein
the first end surface and the second end surface face in a second axial direction orthogonal to the first axial direction, and the multi-layer ceramic capacitor satisfies the following relationship:

$$W_E/W \leq 0.45,$$

where $W_E$ represents a dimension in cross sections of each of the first internal electrode and the second internal electrode in a third axial direction orthogonal to the first axial direction and the second axial direction, and W represents a dimension in a cross section of the ceramic body in the third axial direction.

8. A multi-layer ceramic capacitor, comprising:
a ceramic body that includes
ceramic layers laminated along a first axial direction,
first internal electrodes and second internal electrodes that are alternately disposed between the ceramic layers, a first end surface to which the first internal electrodes are drawn, a second end surface to which the second internal electrodes are drawn, a first end margin that forms an interval between the first end surface and the second internal electrodes, and a second end margin that forms an interval between the second end surface and the first internal electrodes;

a first external electrode that covers the first end surface and is connected to the first internal electrodes; and a second external electrode that covers the second end surface and is connected to the second internal electrodes, the multi-layer ceramic capacitor satisfying the following relationship:

$$S_E \geq S/400+300,$$

where S ($\mu m^2$) represents an area of the ceramic body and $S_E$ ($\mu m^2$) represents a total area of the first internal electrodes and the second internal electrodes in cross sections of the first end margin and the second end margin that are respectively parallel to the first end surface and the second end surface, and wherein the multi-layer ceramic capacitor satisfies the following relationship:

$$S_E \leq (S/400+300)*2.$$

9. The multi-layer ceramic capacitor according to claim 8, wherein
the first internal electrodes and the second internal electrodes each contain copper as a main component.

10. The multi-layer ceramic capacitor according to claim 9, wherein
the first internal electrodes and the second internal electrodes each has a thickness of 6 $\mu m$ or smaller.

11. The multi-layer ceramic capacitor according to claim 8, wherein
a cross-sectional area of each of the first internal electrode and the second internal electrode is 160 $\mu m^2$ or more.

12. The multi-layer ceramic capacitor according to claim 8, wherein
the first end surface and the second end surface face in a second axial direction orthogonal to the first axial direction, and
the multi-layer ceramic capacitor satisfies the following relationship:

$$T_E/W_E \geq 0.01,$$

where $T_E$ represents a dimension in cross sections of each of the first internal electrode and the second internal electrode in the first axial direction, and $W_E$ represents a dimension in the cross sections of each of the first internal electrodes and the second internal electrodes in a third axial direction orthogonal to the first axial direction and the second axial direction.

13. The multi-layer ceramic capacitor according to claim 8, wherein
the first end surface and the second end surface face in a second axial direction orthogonal to the first axial direction, and
the multi-layer ceramic capacitor satisfies the following relationship:

$$W_E/W \leq 0.45,$$

where $W_E$ represents a dimension in cross sections of each of the first internal electrode and the second internal electrode in a third axial direction orthogonal to the first axial direction and the second axial direction, and W represents a dimension in a cross section of the ceramic body in the third axial direction.

14. A multi-layer ceramic capacitor, comprising:
a ceramic body that includes
ceramic layers laminated along a first axial direction,
first internal electrodes and second internal electrodes that are alternately disposed between the ceramic layers,
a first end surface to which the first internal electrodes are drawn,
a second end surface to which the second internal electrodes are drawn,
a first end margin that forms an interval between the first end surface and the second internal electrodes, and
a second end margin that forms an interval between the second end surface and the first internal electrodes;
a first external electrode that covers the first end surface and is connected to the first internal electrodes; and
a second external electrode that covers the second end surface and is connected to the second internal electrodes,
the multi-layer ceramic capacitor satisfying the following relationship:

$$S_E \geq S/400+300,$$

where S ($\mu m^2$) represents an area of the ceramic body and $S_E$ ($\mu m^2$) represents a total area of the first internal electrodes and the second internal electrodes in cross sections of the first end margin and the second end margin that are respectively parallel to the first end surface and the second end surface, and
wherein a cross-sectional area of each of the first internal electrodes and the second internal electrodes is 160 $\mu m^2$ or more.

15. A multi-layer ceramic capacitor, comprising:
a ceramic body that includes
ceramic layers laminated along a first axial direction,
first internal electrodes and second internal electrodes that are alternately disposed between the ceramic layers,
a first end surface to which the first internal electrodes are drawn,
a second end surface to which the second internal electrodes are drawn,
a first end margin that forms an interval between the first end surface and the second internal electrodes, and
a second end margin that forms an interval between the second end surface and the first internal electrodes;
a first external electrode that covers the first end surface and is connected to the first internal electrodes; and
a second external electrode that covers the second end surface and is connected to the second internal electrodes,
the multi-layer ceramic capacitor satisfying the following relationship:

$$S_E \geq S/400+300,$$

where S ($\mu m^2$) represents an area of the ceramic body and $S_E$ ($\mu m^2$) represents a total area of the first internal electrodes and the second internal electrodes in cross sections of the first end margin and the second end margin that are respectively parallel to the first end surface and the second end surface, and
wherein the first end surface and the second end surface face in a second axial direction orthogonal to the first axial direction, and
the multi-layer ceramic capacitor satisfies the following relationship:

$$T_E/W_E \geq 0.01,$$

where $T_E$ represents a dimension in cross sections of each of the first internal electrodes and the second internal electrodes in the first axial direction, and $W_E$ represents a dimension in the cross sections of each of the first internal electrodes and the second internal electrodes in a third axial direction orthogonal to the first axial direction and the second axial direction.

16. The multi-layer ceramic capacitor according to claim 15, wherein
the first internal electrodes and the second internal electrodes each contain copper as a main component.

17. The multi-layer ceramic capacitor according to claim 16, wherein
the first internal electrodes and the second internal electrodes each has a thickness of 6 $\mu m$ or smaller.

18. The multi-layer ceramic capacitor according to claim 15, wherein
a cross-sectional area of each of the first internal electrodes and the second internal electrodes is 160 $\mu m^2$ or more.

19. The multi-layer ceramic capacitor according to claim 15, wherein
the first end surface and the second end surface face in a second axial direction orthogonal to the first axial direction, and
the multi-layer ceramic capacitor satisfies the following relationship:

$$W_E/W \leq 0.45,$$

where $W_E$ represents a dimension in cross sections of each of the first internal electrodes and the second internal electrodes in a third axial direction orthogonal to the first axial direction and the second axial direction, and W represents a dimension in a cross section of the ceramic body in the third axial direction.

20. A multi-layer ceramic capacitor, comprising:
a ceramic body that includes
ceramic layers laminated along a first axial direction,
first internal electrodes and second internal electrodes that are alternately disposed between the ceramic layers,
a first end surface to which the first internal electrodes are drawn,
a second end surface to which the second internal electrodes are drawn,
a first end margin that forms an interval between the first end surface and the second internal electrodes, and
a second end margin that forms an interval between the second end surface and the first internal electrodes;
a first external electrode that covers the first end surface and is connected to the first internal electrodes; and a second external electrode that covers the second end surface and is connected to the second internal electrodes, the multi-layer ceramic capacitor satisfying the following relationship:

$$S_E \geq S/400+300,$$

where S ($\mu m^2$) represents an area of the ceramic body and $S_E$ ($\mu m^2$) represents a total area of the first internal electrodes and the second internal electrodes in cross sections of the first end margin and the second end margin that are respectively parallel to the first end surface and the second end surface, and wherein the first end surface and the second end surface face in a second axial direction orthogonal to the first axial direction, and the multi-layer ceramic capacitor satisfies the following relationship:

$$W_E/W \leq 0.45,$$

where $W_E$ represents a dimension in cross sections of each of the first internal electrodes and the second internal electrodes in a third axial direction orthogonal to the first axial direction and the second axial direction, and W represents a dimension in a cross section of the ceramic body in the third axial direction.

* * * * *